(12) United States Patent
Grand et al.

(10) Patent No.: US 7,181,560 B1
(45) Date of Patent: Feb. 20, 2007

(54) METHOD AND APPARATUS FOR PRESERVING COMPUTER MEMORY USING EXPANSION CARD

(76) Inventors: Joseph Grand, 220 Buckminster Rd., Brookline, MA (US) 02445; Brian Carrier, 96 Knox Rd., Bow, NH (US) 03304

( * ) Notice: Subject to any disclaimer, the term of this patent is extended or adjusted under 35 U.S.C. 154(b) by 657 days.

(21) Appl. No.: 10/325,506

(22) Filed: Dec. 20, 2002

Related U.S. Application Data

(60) Provisional application No. 60/342,318, filed on Dec. 21, 2001.

(51) Int. Cl.
*G06F 13/00* (2006.01)
*G06F 11/30* (2006.01)
*G06F 1/26* (2006.01)

(52) U.S. Cl. ............... 710/300; 710/301; 713/192; 713/194; 726/35

(58) Field of Classification Search .............. 710/2, 710/300, 301; 714/15; 726/22–23, 35; 713/192, 713/194
See application file for complete search history.

(56) References Cited

U.S. PATENT DOCUMENTS

| 4,907,150 | A | * | 3/1990 | Arroyo et al. | 713/323 |
| 5,497,494 | A |   | 3/1996 | Combs et al. | |
| 5,960,460 | A | * | 9/1999 | Marasco et al. | 711/162 |
| 6,079,030 | A |   | 6/2000 | Masubuchi | |
| 6,145,068 | A | * | 11/2000 | Lewis | 711/170 |
| 6,202,090 | B1 | * | 3/2001 | Simone | 709/220 |
| 6,240,527 | B1 |   | 5/2001 | Scheneider et al. | |
| 6,243,831 | B1 | * | 6/2001 | Mustafa et al. | 714/24 |
| 6,839,894 | B1 | * | 1/2005 | Joshi et al. | 717/130 |
| 6,851,073 | B1 | * | 2/2005 | Cabrera et al. | 714/15 |
| 2004/0034800 | A1 | * | 2/2004 | Singhal et al. | 713/201 |
| 2005/0131652 | A1 | * | 6/2005 | Corwin et al. | 702/127 |

OTHER PUBLICATIONS

Technical Work Group for Electronic Crime Scene Investigation, "Electronic Crime Scene Investigation: A Guide for First Responders", Jul. 2001, U.S. Department of Justice, http://www.ncjrs.org/pdffiles1/nij/187736.pdf, pp. 6-7.*

* cited by examiner

*Primary Examiner*—Mark H. Rinehart
*Assistant Examiner*—Faisal Zaman
(74) *Attorney, Agent, or Firm*—Goodwin Procter, LLP

(57) ABSTRACT

A method for preserving digital evidence of a computer misconduct, the method including the steps of: prior to the misconduct, installing an expansion card capable of retrieving and storing a memory image and register information from a digital electrical computer in which the expansion card is installed; connecting a switch to regulate the expansion card from a location other than the computer; at the time of the misconduct, using the switch to trigger the retrieving and storing of the memory image and the register information into the expansion card; and subsequent to the misconduct, extracting the expansion card to preserve digital evidence of the computer misconduct. This method can be carried out further by subjecting the memory image and register information from the expansion card with another computer to forensic analysis.

25 Claims, 2 Drawing Sheets

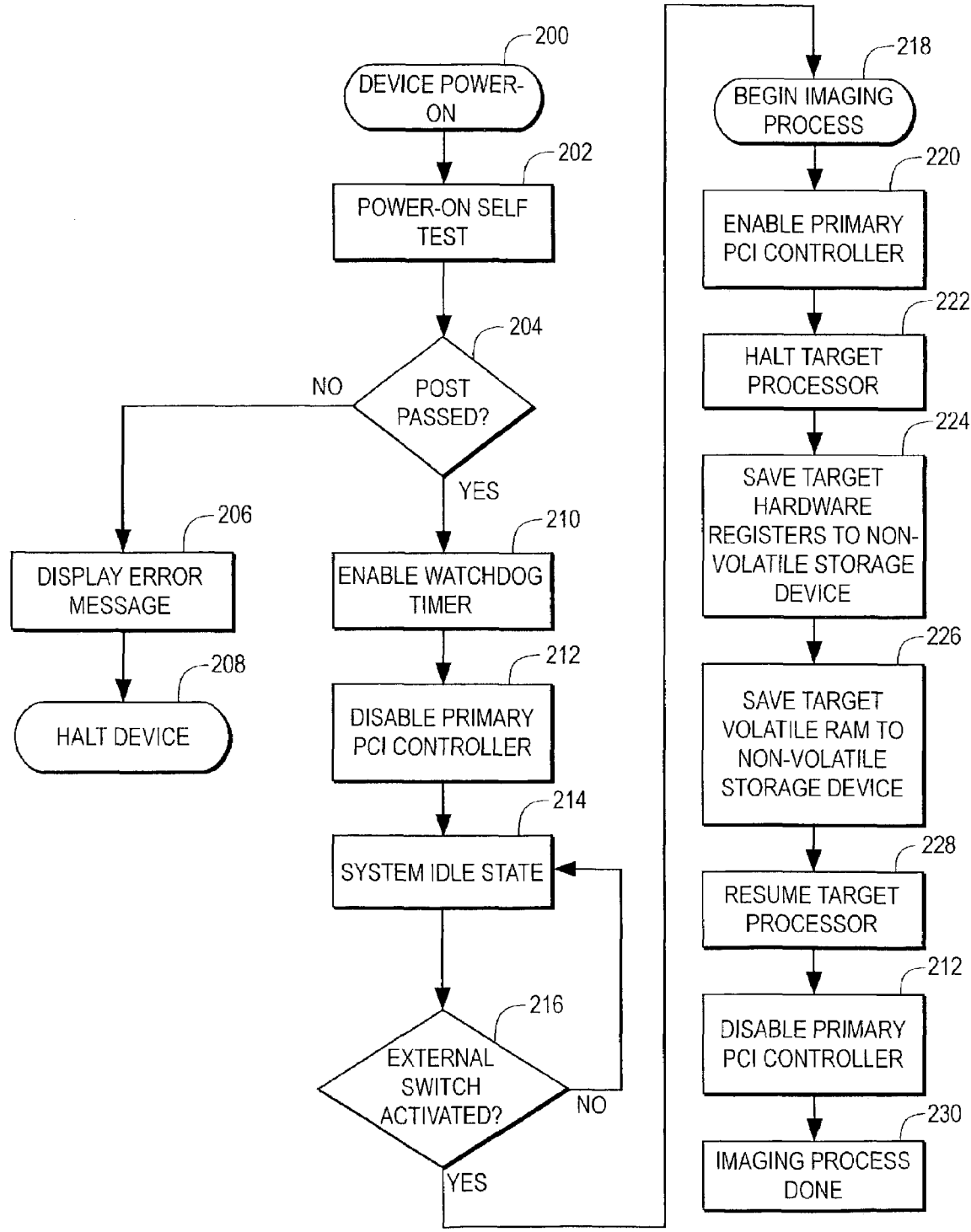

METHOD AND APPARATUS FOR PRESERVING COMPUTER MEMORY USING EXPANSION CARD

Figure 1:
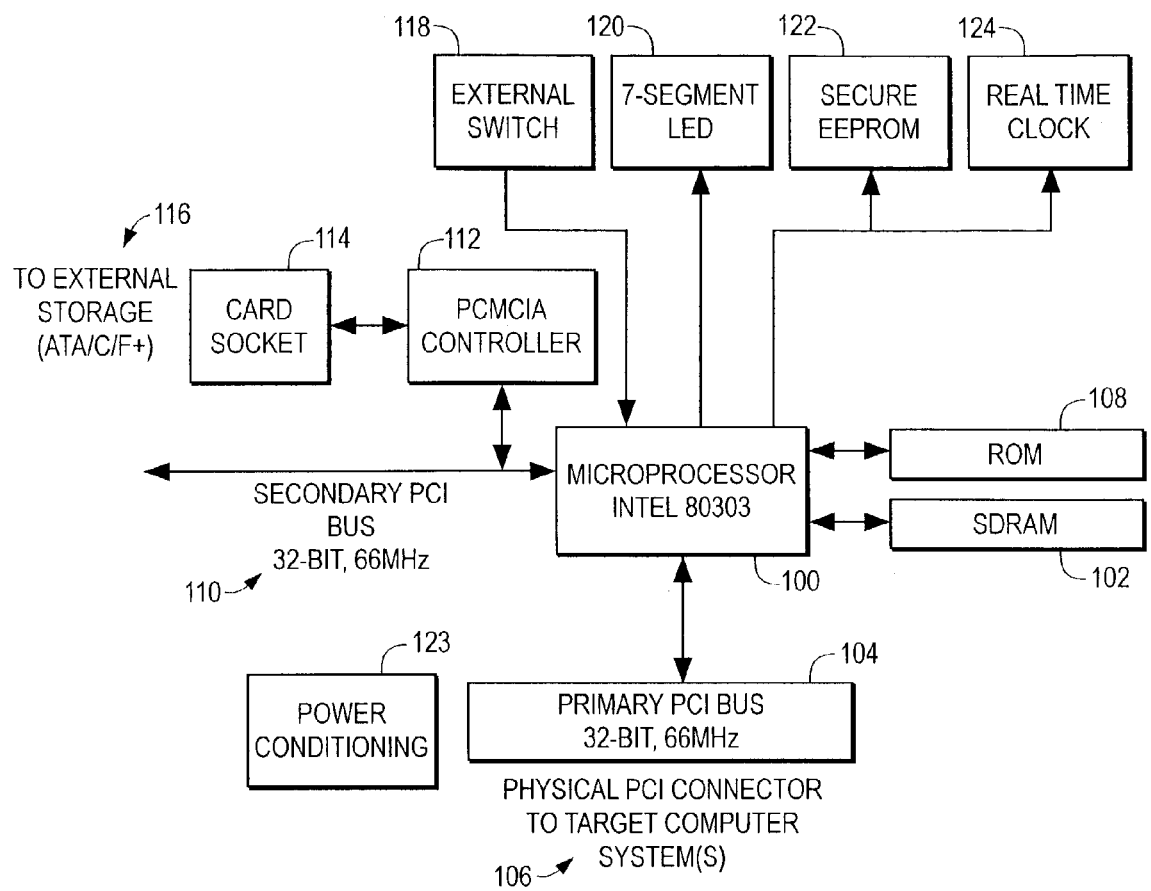

This patent application claims priority from, and incorporates by reference, U.S. Patent No. 60/342,318 filed by the inventors herein on Dec. 21, 2001 on this same subject.

I. FIELD OF THE INVENTION

The present invention pertains to an electrical digital computer machine and a data processing system, methods for making and for using the machine, products produced thereby, as well as data structures and articles of manufacture pertaining thereto, all in the field of methods and hardware for forensic computer memory image retrieval. More particularly, the present invention relates to the data protection of a computer system in the event of a computer misconduct, more particularly, to the duplication of data and applications stored in the volatile computer system memory onto a non-volatile storage medium.

II. BACKGROUND OF THE INVENTION

One goal of computer crime incident response is to preserve the entire crime scene (e.g., computer system) with minimal or no modification to the data on the system in order to provide accurate data for a digital forensic analysis. In addition, many times an incident occurs in a corporate environment where system down time is expensive and the system administrator may not be trained to handle computer incidents.

Digital forensic analysis analyzes digital data to find evidence of an incident. Digital data is typically stored on either non-volatile media, such as hard disk drives, or on volatile media, such as memory. When responding to a computer incident, one wants to copy every bit of data from the suspect system to a trusted system. The data can be analyzed on the trusted system, while the suspect system can be put back into operation.

Prior digital forensic analysis techniques rely dominantly on the contents of a computer system hard drive (system logs, time stamps, file modification, temporary files) for crime investigation. Previously known products exist to duplicate a non-volatile computer system hard drive to another non-volatile storage medium, primarily for data back-up purposes and digital forensic analysis for computer crime investigations. This limits the amount of useful information that can be analyzed, as the volatile memory in an active computer system contains information about current processes executing on the system, the state of user activity, temporary data items, and other components that aid in forensic analysis.

Prior techniques to acquire volatile memory require software-based tools. This has problems because the acquisition software will need to be loaded into memory, which will overwrite possible evidence. An additional problem is that the process can cause stability issues in some systems and cause them to fail. Attackers can also modify the operating system to hide evidence from an investigator. A hardware solution can solve these problems.

Prior incident response techniques require extensive training. One must have trusted copies of software tools, as an attacker could have modified the tools on the system. The responder must also have training for running the tools to acquire the appropriate data. If an organization does not have trained staff and relies on third-party for assistance, there is no way for the organization to freeze the live system until the response team arrives.

The following U.S. patents are known and incorporated by reference:

| U.S. Pat. No. | Date    | Inventor          |
|---------------|---------|-------------------|
| 5,497,494     | 3/1996  | Combs, et at.     |
| 4,907,150     | 3/1990  | Arroyo, et al.    |
| 5,960,460     | 9/1999  | Marasco, et al.   |
| 6,079,030     | 6/2000  | Masubuchi         |
| 6,145,068     | 11/2000 | Lewis             |
| 6,202,090     | 3/2001  | Simone            |
| 6,240,527     | 5/2001  | Schneider, et at. |
| 6,243,831     | 6/2001  | Mustafa, et al.   |

III. SUMMARY OF THE INVENTION

Briefly, one of many objects of the invention is to preserve the volatile memory contents of a computer system while obtaining an exact snapshot of the current state of data stored in memory. Because the preferred embodiment of the invention is purely hardware-based and does not rely on any software or drivers on the target computer system, the data retrieved from the volatile memory is known to be correct and not tampered with by a computer misconduct.

An advantage to this invention is the ease-of-use compared to complex low-level debugging solutions, such as analyzing software-based core dumps of memory, allowing a user of any skill level to properly preserve the volatile memory contents of a suspected compromised computer system. A snapshot of the complete memory image is stored safely on an external device.

Another object of the invention is to provide an additional layer of forensic readiness. Forensic readiness, which is considered part of computer security incident response planning, maximizes an environment's ability to collect credible digital evidence. Digital evidence that is retrieved by forensic readiness and acquisition procedures can be used by forensic investigators, incident response teams, and criminal and civil prosecutors. By installing the invention on a critical computer system before an attack occurs, the user of the invention is prepared to properly capture system memory without disturbing the crime scene.

The invention is intended for systems that contain sensitive information such as financial or confidential data, but can be installed and used on any type of computer system.

These and other objects and advantages of the present invention can be addressed as set forth below. From a general perspective, however, the volatile memory in an active computer system contains information about current processes executing on the system, the state of user activity, temporary data items, and other components that aid in digital forensic analysis in the event of a computer misconduct. When a computer misconduct on a system has occurred and the system powered off, the volatile memory contents are lost; losing information that may be critical to a criminal investigation. Storing the volatile memory image contents on the computer system's hard drive should be avoided, as the process will overwrite erased data on the hard drive which might contain useful information or evidence. However, if the computer system remains active, a malicious user could return and cause further damage.

A preferred embodiment comprises of an expansion card that is installed into a computer system which is capable of retrieving and transferring an exact image of the volatile memory and processor register information of a computer system to a non-volatile storage medium, such as a removable hard drive or external memory module. The preferred embodiment has a physical switch, when activated by a human being, that begins the imaging process and will save the system state by retrieving and storing the current volatile memory image and processor registers. After computer misconduct has been detected, a user of the computer system will activate the preferred embodiment by pressing the switch. When the imaging process is complete, the external storage device can be removed from the system. The data stored on the external storage device can be analyzed on a separate computer system to aid in computer crime or other investigations.

IV. BRIEF DESCRIPTION OF THE DRAWINGS

A better understanding of the present invention can be obtained when the following detailed description of the preferred embodiment is considered in conjunction with the following drawings, in which:

FIG. 1 is a system level block diagram of the preferred embodiment in accordance with the present invention; and FIG. 2 is a flow diagram illustrating the steps taken according to the present invention for a complete memory imaging process.

V. DETAILED DESCRIPTION OF A PREFERRED EMBODIMENT

Incorporate by reference U.S. Pat. No. 6,243,831 which illustrates the design and operation of a typical desktop or portable computer system. Such a computer system is the target computer system in which the invention is installed into, referred to as S in the following detailed disclosure.

Referring to the drawings, FIG. 1 shows a block diagram of the critical electrical components and interconnections within the preferred embodiment. The microprocessor 100, also known as the central processing unit (CPU) or processor is shown. The processor 100 may be a single microprocessor, such as Intel Corporation's Pentium processor, a more elaborate or dedicated CPU system including multiple microprocessors and other components, or a custom application-specific integrated circuit (ASIC) or programmable logic device (FPGA). The preferred embodiment uses an Intel Corporation 080303 I/O Processor as processor 100.

The Intel Corporation 80303 I/O Processor contains, but is not limited to, a 100 MHz Intel 80960JT core processor, a glueless interface to ROM and SDRAM, an I2C bus interface, and a number of general purpose I/O (GPIO) pins for connections of the external switch 118, 7-segment LED display 120, Secure EEPROM 122, and Real Time Clock 124.

The Intel Corporation 80303 I/O Processor also contains a primary PCI bus 104, up to 64-bit, 66 MHz, which connects into system S and a secondary PCI bus 110, up to 64-bit, 66 MHz, for on-board connections to PCI-based components. In this preferred embodiment, both primary and secondary PCI buses 104 and 110 are configured for 32-bit, 66 MHz operation.

The Primary PCI Bus 104 is connected to the physical PCI connector 106, which is installed into S. The PCI interface was chosen as the interface for the preferred embodiment due to the fact that it is a common, high-speed interface that is readily available in the majority of computer systems on the market and was designed specifically for hardware modules such as this preferred embodiment to be plugged in to a computer system's bus. Additionally, the PCI interface is software independent, meaning it does not rely on any software or drivers executing on system S. The PCI interface supports Direct Memory Access (DMA) to other peripherals on system S without the necessity of software drivers or knowledge of the operating system being used in system S. Any software running on a target system S that has been compromised by a computer misconduct is considered unreliable and untrusted, since a malicious user could have modified the software. Such software-independence of the preferred embodiment allows the preferred embodiment to be universal in the fact that system S could contain any hardware configuration and any operating system and the preferred embodiment would still perform as intended.

The preferred embodiment's firmware operating code resides in read-only-memory (ROM) 108 and is not writeable or field upgradeable. This prevents an unauthorized user from changing program code or operation or disabling the preferred embodiment from the computer system bus. The ROM 108 is a standard off-the-shelf 2M×8-bit device.

The on-board SDRAM 102 is a standard, off-the-shelf 512M×8-bit device. The SDRAM 102 is used to store temporary variables, program stack, and other necessary operating data. The SDRAM 102 is also used for the buffering and temporary storage of the volatile memory and processor hardware registers of system S during the memory imaging process, as disclosed further in this document. If the preferred embodiment is to be used in a higher-powered system S, additional SDRAM can be added to allow for larger storage.

The external switch 118 is used to regulate the preferred embodiment and primarily to begin the imaging process. The switch is a standard, off-the-shelf SPST momentary push button switch, which is activated by a human being when a computer misconduct is detected. As a security precaution, the preferred embodiment must rely only on physical activation. Doing so prevents software executing on system S, either legitimate or intentionally destructive, from possibly gaining control of the preferred embodiment and attempting to change the program functionality or operating environment of the preferred embodiment.

User configurable options, set with the external switch 118, and audit trail information (history of device usage, including date and time stamps) are stored in a secure non-volatile EEPROM memory device 122, the Dallas Semiconductor DS2432 for this preferred embodiment, which uses the SHA-1 digital signature algorithm. This secure memory chip is used to protect stored data and authenticate attempted data operations. If an unauthorized user were to attempt to access data stored on the secure memory device 122, through program operation modification or physical access, data will not be able to be determined.

The external 7-segment LED display 120 provides device operation and status information to the user. The 7-segment LED display 120 is used in conjunction with the external switch 118 to enable the user to set user configurable options. The 7-segment LED 120 can display the following alpha-numeric characters which are used to enable the user to better understand the current operating state of the preferred embodiment: 0, 1, 2, 3, 4, 5, 6, 7, 8, 9, A, b, C, d, E, F, g, H, I, J, L, O, P, S, U, y. The 7-segment LED 120 displays a particular alpha-numeric character to notify the user of the following system events:

1. Power On
2. Idle/Ready-to-Image

3. Imaging in Process
4. Error (of various types)
5. Process Successful

Though this preferred embodiment uses a 7-segment LED display 120, other display components could be used in its place, such as an LCD panel.

An on-board Real-Time Clock (RTC) 124 is used to keep an accurate system time for the purposes of the preferred embodiment. Primarily, the RTC 124 is used for time-stamping during the volatile memory imaging process of S in order to correlate the actual time with the time assumed by the system S. Knowing such actual and assumed times aid in forensic analysis of the data retrieved by the preferred embodiment and enables an investigator to determine at what point in time an application or process was being executed on system S. This preferred embodiment uses a Dallas Semiconductor DS1511 module, which is a full function, year 2000-compliant, real-time clock/calendar with an RTC alarm, watchdog timer, power-on reset, battery monitors, +3.0V Battery, 256 bytes nonvolatile static RAM, and a 32.768 kHz output. The RTC 124 is connected to the processor 100 through a byte-wide interface.

The preferred embodiment uses a PCMCIA interface to connect to a non-volatile external storage device 116, in this case an IBM 1 GB MicroDrive which has an ATA/CF+ interface which is supported by the PCMCIA controller 112. The non-volatile external storage device 116 is used by the preferred embodiment to store the exact replica of the volatile memory and processor hardware registers of system S, and allows the user of the preferred embodiment a method of easily removing the external storage device 116 to bring to a separate computer system for data analysis purposes. The non-volatile external storage device 116 can consist of any PCMCIA-supported non-volatile external memory devices, such as CompactFlash, Sony Memory Stick, solid-state memory drives, miniature hard drives, or control interfaces to other interface protocols such as IDE or SCSI. Additionally, other PCMCIA-supported devices, such as network interface cards or wireless interface cards, could be inserted into the preferred embodiment to allow for future expansion of features of the preferred embodiment.

The PCMCIA controller 112 is an industry-standard Texas Instruments Incorporated PCI1225 PC Card Controller, which connects to the secondary PCI bus 110 of the preferred embodiment, which in turn connects directly to the processor 100. Using a PCMCIA controller 112 is a simple and effective way to enable PCMCIA functionality in the embodiment. A physical card socket 114 designed to meet the PCMCIA physical requirements is used to interface the non-volatile external storage device 116 to the PCMCIA controller 112. PCMCIA has an interface transfer rate of approximately 11 MB to 16 MB per second. The PCMCIA controller 112 supports two PC Card or CardBus slots with hot insertion and removal, and is compliant with PCI Local Bus Specification Revision 2.2, 1997 PC Card Standard, and PC 99. An Intel Corporation PD6729 PCI-to-PC Card Controller, or any other PCI-to-PC Card interface circuitry, can be used in place of the PCMCIA controller 112 defined for this preferred embodiment.

Power Conditioning 126 consists of standard discrete circuitry to generate voltages which are usable by the electronic components of the preferred embodiment. The circuitry consists of a linear low-dropout voltage regulator to generate the required +3.3V system voltage, and a microprocessor supervisory circuit to monitor the +3.3V system voltage to ensure it does not drop to a dangerously low level. If the linear low-dropout voltage regulator fails, the microprocessor supervisory circuit will remove all power to the system, effectively disabling the preferred embodiment but preventing any harm to the preferred embodiment's circuitry.

Referring to the drawings, FIG. 2 shows a flow diagram illustrating the steps taken according to the present preferred embodiment for a complete memory imaging process. At step 200, the preferred embodiment is powered on, which is achieved when the system S is turned on, since the preferred embodiment is powered by the PCI bus of system S.

When voltages on the preferred embodiment reach acceptable levels as determined by the Power Conditioning 126 circuitry, the Power-On Self Test (POST) begins in step 202. POST consists of a number of test procedures and algorithms that the preferred embodiment executes to verify complete functionality of each critical module on the preferred embodiment, including the following sub-steps:

1. Test 7-segment LED 120 or other display devices
2. Initialize hardware and on-board memory configuration
3. Test on-board SRAM 102 data bus
4. Test on-board SRAM 102 address bus
5. Test on-board SRAM 102 device functionality
6. Compute CRC32 checksum and MD5 hash of program code stored in ROM 108
7. Test physical external switch 118
8. Test interface to external storage device 116
9. Test PCI Primary bus interface 104 to the target computer system S In step 204, if POST fails in any form, an error message is displayed on the 7-segment LED 120, step 206, and the preferred embodiment enters a halted state, step 208, essentially an infinite loop in which no more program code is allowed to execute on the preferred embodiment until the detected error is corrected and the preferred embodiment is power-cycled to bring it back to step 200.

In step 204, if POST passes in its entirety, control proceeds to step 210, in which the Watchdog Timer, built-in to the Real Time Clock 124, is configured and enabled. The Watchdog Timer is a timer that needs to be reset within a programmable length of time or the Watchdog Timer will cause an interrupt on the processor 100 and halt operation of the preferred embodiment. The Watchdog Timer is used for detecting failures of the system and executing program code, because if the timer is not updated (as the program code is programmed to do), one can assume the program code is not executing properly and the system should be shut down. Throughout the program code of the preferred embodiment, instructions exist to reset the Watchdog Timer built-in to the Real Time Clock 124 in order to convey proper functionality of the preferred embodiment.

After step 210, control proceeds to step 212, which disables primary PCI controller 104 of the processor 100, achieved by configuring hardware registers on processor 100. The primary PCI controller 104 is disabled to prevent the system S hardware or software applications executing on system S from detecting that the preferred embodiment actually exists and is installed into system S. If a malicious user is aware of the preferred embodiment existing in system S, he or she may change their process of computer misconduct to avoid detection.

After step 212, the preferred embodiment is sufficiently prepared and enters a System Idle State 214 in which the preferred embodiment is in a stand-by mode waiting for an interrupt to be posted caused by the external physical switch 118 being activated (step 216). If the external physical switch 118 is not activated, the preferred embodiment will remain in the System Idle State 214 until it is activated. Once the external physical switch is activated, step 216, control proceeds to step 218 in which the actual process of imaging the volatile memory of system S begins.

Step 218 begins the actual process of imaging the volatile memory of system S without modification to said volatile memory, one of the objects of the invention. To do so without completely disrupting the operation of system S and without writing to or changing the contents of volatile memory on system S, the following specific steps are necessary.

First, step 220 enables primary PCI controller 104 of the processor 100, achieved by configuring hardware registers on processor 100. Once the primary PCI controller 104 is enabled, system S will be aware that an external PCI card (in this case, the preferred embodiment) has been installed into the system S. With the primary PCI controller 104 enabled on the preferred embodiment, the preferred embodiment now has direct hardware access to the PCI bus of the entire computer system S.

Next, control proceeds to step 222, in which the target processor of system S is halted by the preferred embodiment to ensure that the volatile memory of system S is not written to or updated during this time and to ensure that the external storage device 116 receives an exact replica or "snapshot" of the computer system memory at that given point in time. The actual process of imaging the volatile memory of system S often requires a substantial amount of time, minutes or even hours, to copy the volatile memory of system S to external storage device 116, depending on the size of the volatile memory of system S, the bus speed of the primary PCI bus interface 104, and the operating speed of the external storage device 116. Additionally, halting the target processor of system S prevents a malicious user from running a potentially dangerous or destructive program on S, which could modify the volatile memory of system S, thus possibly overwriting or changing information that could be useful during a forensic analysis or investigation of a computer misconduct.

For this preferred embodiment, the process of halting the processor in system S is as follows: A HALT instruction is sent by the preferred embodiment to the target computer system processor via the PCI bus 104. The HALT instruction causes the processor in system S to enter an "Auto HALT Power Down State," which is essentially a sleep state that reduces power consumption by stopping the clock to internal sections of the processor in S. By doing so, the processor in S or any software applications running on S cannot read or write to the volatile system memory that the preferred embodiment is about to retrieve and store on the external storage device 116. The preferred embodiment issues a PCI Special Message "Halt" command to notify other hardware devices on the PCI bus of S that the processor in system S has fetched and is executing a Halt instruction. The Special Message is used to indicate to all external devices installed in S that the processor in system S is going to cease fetching and executing instructions. However, a race condition occurs in the fact that other hardware components installed on the system S may still be able to use DMA to read and write to the volatile system memory of S, even if the processor in system S is in a halted state, before the preferred embodiment takes control of the volatile memory device in S. This may change the state of volatile memory in S before or during the memory imaging process, creating a non-exact duplication of the volatile memory of system S.

With the processor in system S halted in step 222, control then proceeds to step 224, in which the preferred embodiment saves the system S processor registers onto the external storage device 116. The primary PCI controller 104 of the preferred embodiment acts as a master on the PCI bus and controls the DMA transfer which allows the preferred embodiment to obtain information via DMA from any device attached to the PCI bus. The processor type in system S is first identified through DMA. If the processor type in system S is unable to be detected, control proceeds immediately to step 226. Once the processor type in system S is identified, its register states are obtained via DMA and temporarily stored in the SDRAM 102. Once all the register states of the processor in system S are obtained and stored in the SDRAM 102, the data stored in the SDRAM 102 is transferred to the external storage device 116 via the PCMCIA interface 112 and 114 of the preferred embodiment. The data stored in the SDRAM buffer 102 is then erased.

Control proceeds to step 226, in which the preferred embodiment saves the entire volatile memory contents of system S onto the external storage device 116, starting at memory location 0 of the system S and continuing incrementally until the entire volatile memory space of system S has been duplicated. Using DMA, the volatile memory contents of system S are transferred in chunks and temporarily stored in the SDRAM 102. When the buffer in SDRAM 102 is full (dependant on the size of the SDRAM 102 device, which is 512 MB for the preferred embodiment), the data in the SDRAM 102 is transferred to the external storage device 116 via the PCMCIA interface 112 and 114 of the preferred embodiment. When the entire volatile memory space of system S has been read and transferred to the external storage device 116, the data stored in the SDRAM buffer 102 is then erased.

Control then proceeds to step 228, in which the preferred embodiment will cause an interrupt to the processor of system S to enable a transition of the system S processor back to a normal executing state. This in turn brings the complete system S back to a normal functioning state.

Control then proceeds to step 212, disclosed above, which again disables the primary PCI controller 104 of the processor 100, achieved by configuring hardware registers on processor 100.

Control then proceeds to step 230, in which an MD5 hash of the entire external storage device 116 is calculated by the preferred embodiment and stored back onto the external storage device 116. The calculated MD5 hash allows the user to have an integrity check of all data stored on the external memory device 116 after the imaging process is complete and before the data is used for analysis purposes.

The preferred embodiment then returns to the system idle state 214 and waits for another activation of the external switch 118. The external storage device 116, which now contains an exact image of the volatile memory of system S along with an MD5 hash of the entire data, can be removed from the preferred embodiment and brought to another location for analysis of the data contents.

An enhancement of this preferred embodiment would be to allow the retrieved volatile memory and hardware registers of system S, which are stored on the external memory device 116, to be reloaded back into system S by essentially changing the functionality of steps 224 and 226 to write to system S instead of reading from system S. This enhancement allows for the recreation of the state of a computer system at a given point in time (possibly at the exact detection time of a computer misconduct) to aid in analysis purposes.

The preferred embodiment assumes that the target system S is in a physically secure environment in which unauthorized users are prevented from accessing the system S.

Implementing user authentication to allow only authorized, identified individuals to operate the preferred embodiment is recommended depending on the environment that the preferred embodiment is used in.

Although the above description contains specific examples of one preferred embodiment, other embodiments could work equally as well. The above disclosure should not be construed as limiting the scope of the preferred embodiment, but as merely providing illustrations of some of the preferred embodiments. Many variations are possible and are to be considered within the scope of the present preferred embodiment. For instance: The external storage medium is not limited to floppy disks, compact disks, computer hard drivers, or removable memory modules. The interface used for the preferred embodiment to be installed to the target computer system S is not limited to the PCI bus or PCMCIA card, other such interfaces may be USB, Firewire (IEEE 1394), or RS232, provided that the interface with the system S is not software-dependent and does not affect the volatile memory of system S while duplication is taking place, as an object of the invention is to create an exact image of the volatile memory of system S without any modification of said memory. The actual method of duplicating the computer system memory contents from the volatile memory to non-volatile storage device is not limited to a simple bit-by-bit copy as disclosed in step 226, any number of compression or data transfer algorithms could be used.

While a particular preferred embodiment has been disclosed, it is to be understood that various different modifications are possible and are within the true spirit of the invention. Accordingly, other computerized aspects in accordance with the present preferred embodiment, can be well imagined from the instant disclosure. The scope of the present preferred embodiment is to be determined with reference to the claims set forth below, and there is no intention to limit the invention to the exact disclosure presented herein as a teaching of one embodiment of the preferred embodiment.

We claim:

1. A method for preserving digital evidence of a computer misconduct, the method including the steps of:
   providing an expansion card configured for retrieving and storing a complete memory image and register information from a digital electrical computer in which the expansion card is installed;
   attaching the expansion card to the computer;
   configuring one or more hardware registers on the expansion card such that prior to activation the expansion card is undetectable by the computer;
   activating the expansion card from a location other than the computer, thereby initiating instructions on the card that trigger the retrieval and storage of the complete memory image and the register information into the expansion card such that operation of the expansion card does not modify or store any information in the digital electrical computer's entire volatile memory upon the activation; and
   extracting the expansion card to preserve digital evidence of computer misconduct.

2. The method of claim 1, further including the step of:
   subjecting the memory image and register information from the expansion card to another computer to provide forensic analysis.

3. A method for preserving memory content of a computer system comprising:
   attaching an expansion card to a computer;
   configuring one or more hardware registers on the expansion card such that prior to activation the expansion card is undetectable by the computer;
   receiving a trigger signal on the removable expansion card thereby initiating instructions on the card that trigger storing the computer system's entire volatile memory content;
   receiving the entire volatile memory content in the removable expansion card based on the received trigger signal, wherein no information is modified or stored in the entire volatile memory upon receipt of the trigger signal by the removable expansion card; and
   storing the entire volatile memory content in a non-volatile memory included in the removable expansion card.

4. The method of claim 3, further comprising:
   removing the removable expansion card from communication with the computer system; and
   performing forensic analysis of the volatile memory content.

5. The method of claim 3 wherein the trigger signal is initiated by a user interacting with a switch.

6. The method of claim 5 wherein the removable expansion card is connected to the computer system prior to an event that initiates the user interacting with the switch.

7. The method of claim 3 further comprising:
   halting execution of a processor included in the computer system prior to receiving the entire volatile memory content.

8. The method of claim 3 wherein the volatile memory includes a register.

9. The method of claim 3 wherein the volatile memory includes random access memory (RAM).

10. The method of claim 3 further comprising:
    calculating a hash value using a portion of the entire volatile memory content.

11. The method of claim 10 wherein the hash value is stored in the non-volatile memory.

12. The method of claim 3 wherein the removable expansion card includes a peripheral component interconnect (PCI).

13. A computer program product residing on a computer readable storage medium having a plurality of instructions stored thereon which, when executed by a processor, cause the processor to:
    configure one or more hardware registers on a removable expansion card physically attached to a computer such that prior to activation the expansion card is undetectable by the computer;
    receive a trigger signal on the removable expansion card thereby initiating instructions on the card that initiate storing an entire volatile memory of the computer system;
    receive the entire volatile memory content in the removable expansion card based on the received trigger signal, wherein no information is modified or stored in the entire volatile memory upon receipt of the trigger signal by the expansion card; and
    store the entire volatile memory content in a non-volatile memory included in the removable expansion card.

14. The computer program product of claim 13 wherein the removable expansion card is removed from communication with the computer system for forensic analysis of the volatile memory content.

15. The computer program product of claim 13 wherein the trigger signal is initiated by a user interacting with a switch.

16. The computer program product of claim 15 wherein the removable expansion card is connected to the computer system prior to an event that initiates the user interacting with the switch.

17. The computer program conduct of claim 13 further comprising instructions for:

halting execution of a processor included in the computer system prior to receiving the entire volatile memory content.

18. The computer program product of claim 13 wherein the volatile memory includes a register.

19. The computer program product of claim 13 wherein the volatile memory includes random access memory (RAM).

20. The computer program product of claim 13 further comprising instructions for:

calculating a hash value using a portion of the entire volatile memory content.

21. The computer program product of claim 20 wherein the hash value is stored in the non-volatile memory.

22. The computer program product of claim 13 wherein the removable expansion card includes a peripheral component interconnect (PCI).

23. A removable expansion card for preserving content of volatile memory included in a computer system, the removable expansion card comprising:

a processor capable of receiving a trigger signal to initiate a set of instructions stored thereon that initiate the storing of an entire volatile memory content of a computer system;

a peripheral component interface (PCI) configured to be undetectable by the computer system and capable of receiving the entire volatile memory content based on the received trigger signal, wherein no information is modified or stored in the entire volatile memory upon receipt of the trigger signal by the removable expansion card; and a non-volatile memory external storage capable of storing the entire volatile memory content.

24. The removable expansion card of claim 23 wherein the trigger signal is initiated by a user interacting with a switch.

25. The removable expansion card of claim 23 wherein the removable expansion card is connected to the computer system prior to an event that initiates the user interacting with the switch.

\* \* \* \* \*